United States Patent
US008508586B2
US 8,508,586 B2
De La Tocnaye et al.
Aug. 13, 2013

(12) United States Patent
De La Tocnaye et al.

(10) Patent No.: US 8,508,586 B2
(45) Date of Patent: Aug. 13, 2013

(54) SPECTACLES FOR THREE-DIMENSIONAL VIEWING OF DIGITAL VIDEO CONTENT FROM A PROJECTOR

(75) Inventors: Jean-Louis De Bougrenet De La Tocnaye, Guilers (FR); Laurent Dupont, Plouzane (FR); Emmanuel Daniel, Le Relecq Kerhuon (FR)

(73) Assignee: Institut Telecom/Telecom Bretagne, Brest Cedex (FR)

( * ) Notice: Subject to any disclaimer, the term of this patent is extended or adjusted under 35 U.S.C. 154(b) by 528 days.

(21) Appl. No.: 12/812,343

(22) PCT Filed: Jan. 7, 2009

(86) PCT No.: PCT/EP2009/050126
§ 371 (c)(1),
(2), (4) Date: Oct. 5, 2010

(87) PCT Pub. No.: WO2009/087170
PCT Pub. Date: Jul. 16, 2009

(65) Prior Publication Data
US 2011/0018984 A1    Jan. 27, 2011

(30) Foreign Application Priority Data
Jan. 9, 2008    (FR) .................................. 08 50116

(51) Int. Cl.
*H04N 13/04*    (2006.01)
(52) U.S. Cl.
USPC ................... 348/57; 348/58; 348/53; 348/46; 348/43; 353/8; 353/7
(58) Field of Classification Search
USPC .................... 348/57, 58, 53, 46, 43; 353/8, 7
See application file for complete search history.

(56) References Cited

U.S. PATENT DOCUMENTS

| 5,993,004 A * | 11/1999 | Moseley et al. .................... 353/8 |
| 6,222,672 B1 * | 4/2001 | Towler et al. .................. 359/465 |
| 6,252,624 B1 * | 6/2001 | Yuasa et al. ...................... 348/56 |
| 6,943,852 B2 * | 9/2005 | Divelbiss et al. ............... 349/13 |
| 2010/0039588 A1 | 2/2010 | Caillaud et al. |

FOREIGN PATENT DOCUMENTS

| JP | 06211418 | 1/1993 |
| JP | 2000284224 | 10/2000 |
| JP | 2004302315 | 3/2003 |

OTHER PUBLICATIONS

International Search Report and Written Opinion dated Apr. 6, 2009 for corresponding International Application No. PCT/EP2009/050126 filed Jan. 7, 2009.

* cited by examiner

*Primary Examiner* — Shawn An
(74) *Attorney, Agent, or Firm* — David D. Brush; Westman, Champlin & Kelly, P.A.

(57) ABSTRACT

Liquid crystal spectacles are provided for three-dimensional viewing of digital video content from a projector. The viewing spectacles include a first rectilinear polariser and a second rectilinear polariser respectively having polarisation axes P1 and P2, the polarisation axes P1 and P2 being parallel or perpendicular relative to each other. Furthermore, the liquid crystal has an adapted intrinsic tilt angle and is used in a half-wave blade configuration. The liquid crystal further includes first and second separate areas, each respectively located opposite a vision axis. The first area includes a first director and the second area includes a second director. The first and second directors are oriented so as to define an adapted angle between them. This enables a "non-one-eyed" vision while waiting for the projection of the film to start, and to obtain the best possible contrast between the two eyes of the user when viewing the digital video content.

16 Claims, 3 Drawing Sheets

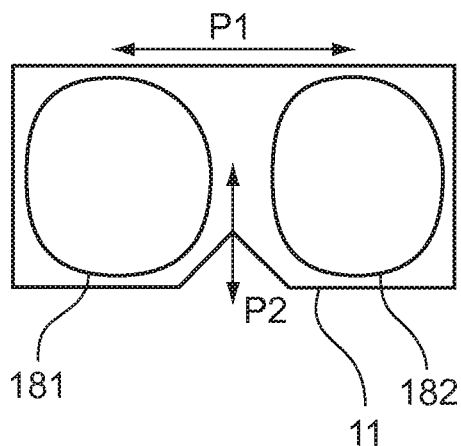
Fig. 4.1.a
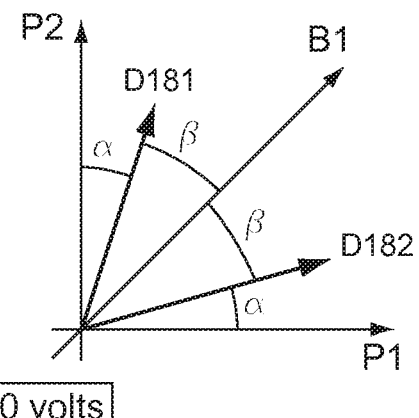
Fig. 4.1.b
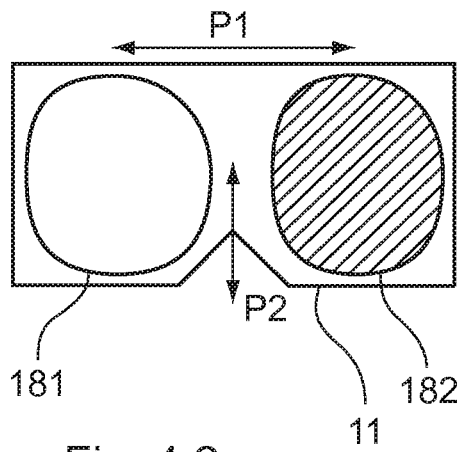
Fig. 4.2.a
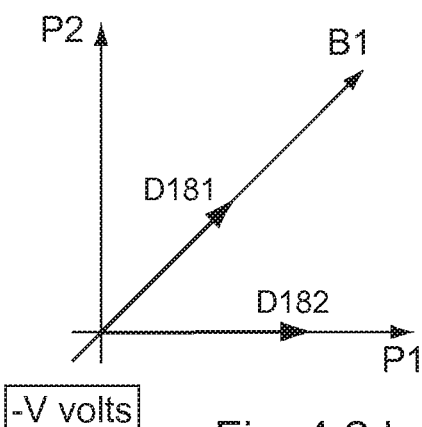
Fig. 4.2.b
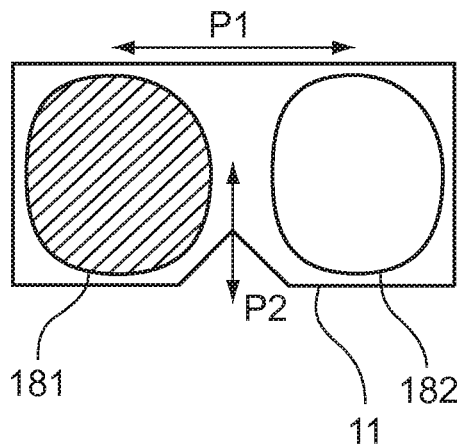
Fig. 4.3.a
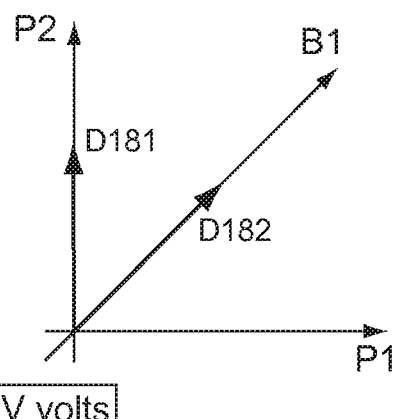
Fig. 4.3.b

SPECTACLES FOR THREE-DIMENSIONAL VIEWING OF DIGITAL VIDEO CONTENT FROM A PROJECTOR

CROSS-REFERENCE TO RELATED APPLICATIONS

This Application is a Section 371 National Stage Application of International Application No. PCT/EP2009/050126, filed Jan. 7, 2009 and published as WO 2009/087170 on Jul. 16, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure concerns the field of the design and production of alternating-viewing spectacles based on liquid crystal, in particular for the three-dimensional (3D) viewing of digital video content.

BACKGROUND OF THE DISCLOSURE

Spectacles based on liquid crystal, particularly used for 3D viewing, are known through the document U.S. Pat. No. 6,943,852. These spectacles are composed of a single cell formed by a first and second substrate situated opposite each other. The space between the two substrates forms a cavity accepting a liquid crystal of the nematic or ferro-electric type (without however specifying the configuration for the latter).

For the record, materials based on liquid crystal constitute materials the optical properties of which can be modified, and in particular the birefringence, by applying to them an electrical field created by the application of a voltage between the two substrates. When placed for example between crossed polariser and analyser, a voltage-controlled optical obturator is then obtained. Such an optical obturator based on liquid crystal then observes at least two states according to the application or not of a voltage at the terminals of the two substrates:
  a so-called passing state in which it allows the light to pass, and
  a closed or blocking state, according to which it does not allow light to pass or according to which it allows only a small part thereof to pass.

In the aforementioned document U.S. Pat. No. 6,943,852, in order to polarise the input and output light and to pass (or block) the output light, three polarisers are used on each side of the cell:
  a first rectilinear polariser of polarisation axis P1 is deposited on the whole of an external face of the first substrate,
  a second rectilinear polariser of polarisation axis P1 also is deposited on part of an external face of the second substrate, opposite the vision axis of the right eye, and
  a third rectilinear polariser of polarisation axis P2 orthogonal to the polarisation axis P1 is deposited on part of the external face of the second substrate, opposite the vision axis of the left eye.

The cell of the spectacles is switchable, that is to say the obturation thereof, controlled by voltage, is triggered and timed by a synchronisation signal.

The spectacles of the aforementioned document U.S. Pat. No. 6,943,852 also comprises a switch for activating electronics supplying the cell. Thus the spectacles are constantly supplied provided that the switch is actuated.

Although interesting and effective, this technique known from the document U.S. Pat. No. 6,943,852 has several drawbacks.

A first drawback concerns the number of elements necessary for producing such spectacles. This is because such spectacles necessarily comprise three polarisers, a single cell based on liquid crystal and the electronics generating the synchronisation signal. The manufacturing cost is therefore high.

A second drawback concerns the electrical consumption of this type of spectacles based on nematic liquid crystal. This is because, to be transparent, such a liquid crystal must be supplied continuously. In the document U.S. Pat. No. 6,943,852, adapted electronics enable to control the liquid crystal contained in the cell. These electronics are started up by actuating the switch ("on" position). Conventionally, such spectacles comprise a self-contained battery. Through actuation of the switch, the battery therefore continuously supplies the electronics of the viewing spectacles. There then exists a real risk of forgetting to put the switch to the "off" position and to select faulty spectacles the battery of which is at the end of its life. A change of spectacles is in this case necessary to continue to view the film.

A third drawback concerns the vision perceived by the user as soon as the viewing spectacles are placed facing the field of vision of the user. In "off" mode (switch in the "off" position), that is to say when the cell switching electronics are not activated, the cell is not switched and the vision perceived by the user is a so-called "one-eye" vision. Only one field of vision (right eye or left eye) allows light to pass. This is because the polarisation axis of the single input polariser is crossed with the polarisation axis of the first output polariser and parallel to the polariser axis of the second output polariser. The light therefore passes through the cell only at the zone defined by the crossed polarisers when it is a case for example of a twisted nematic liquid crystal. This structure therefore imposes on the user a "one-eye" vision. The vision device is therefore not transparent for the user when the switch of the switching electronics is not actuated in the "on" position in order to time the switching of the liquid crystals of the cell and thus prevent "one-eye" vision.

SUMMARY

In a particular embodiment of the invention, spectacles are proposed for the three-dimensional viewing of digital video content from a projector, said spectacles comprising:
  a single cell comprising first and second substrates disposed facing each other in order to form a free space;
  a liquid crystal placed in said free space and used in a half-wave blade configuration;
  a first rectilinear polariser of polarisation axis P1 adapted to polarise light coming from said projector and disposed on a first external surface of the first substrate of the cell.

In a noteworthy manner, said viewing spectacles are characterised in that:
  a second rectilinear polariser of polarisation axis P2 is disposed on a second external surface of the second substrate, said polarisation axes $P_1$ and $P_2$ of the first and second polarisers being parallel or perpendicular to each other, the liquid crystal comprises first and second distinct zones each situated opposite a vision axis, right and left respectively, the first zone comprising a first director and the second zone comprising a second director, said first and second directors:

being symmetrical and each forming an angle β with respect to a first direction B1 defined as the bisector of the two polarisation axes P1 and P2 of the first and second polarisers respectively, if said two polarisation axes P1 and P2 of the first and second polarisers are perpendicular to each other, or being symmetrical and each forming an angle β with respect to a second direction B2 forming an angle of 45° with respect to a common polarisation axis P of the first and second polarisers, if said two polarisation axes P1 and P2 of the first and second polarisers are parallel to each other, or being symmetrical and each forming an angle π/2−β with respect to a third direction B3 perpendicular to the bisector of the two polarisation axes P1 and P2 of the first and second polarisers respectively, if said two polarisation axes P1 and P2 of the first and second polarisers are perpendicular to each other, or being symmetrical and each forming an angle π/2−β with respect to a fourth direction B4 forming an angle of −45° with respect to a common polarisation axis P of the first and second polarisers, if said two polarisation axes P1 and P2 of the first and second polarisers are parallel to each other.

The general principle of an embodiment of the invention therefore consists in limiting the manufacturing costs of the viewing spectacles as well as its power consumption.

Thus, in this particular embodiment, the invention is based on an entirely novel and inventive approach of producing viewing spectacles based on the use of a liquid crystal comprising two distinct zones, thus reducing the number of elements necessary for production thereof.

Equally, the use of polarisers the polarization axes of which are parallel or perpendicular makes it possible to polarize the incoming and outgoing light and to obtain transparent vision with no voltage applied to the liquid crystal (also referred to as "standby mode"). Thus, once placed on the field of vision of the user, the viewing spectacles according to an embodiment of the invention afford to the user transparent vision of the scene even when the film has not yet begun. Unlike the prior art, where the vision perceived by the user is one-eyed as long as the film has not yet begun.

Advantageously, the liquid crystal has an intrinsic tilt angle α comprised between 15° and 30° or the liquid crystal has an intrinsic tilt angle α comprised between 21.5° and 23.5°.

Advantageously, the angle β is comprised between 15° and 30° or the angle β is comprised between 21.5° and 23.5°.

In order to obtain the optimum contrast between the two eyes, the intrinsic tilt angle α and the angle β ideally take a value of 22.5°. Such an arrangement makes it possible to cover the two optimum cases corresponding to a total passage of the light for one eye and extinction of the light for the other eye, and this alternately. These two optimum cases correspond to an input polarisation that is parallel (passage of light) or perpendicular (extinction of light) to the polarisation axis of the output polariser.

Advantageously, the liquid crystal is of the ferroelectric smectic gel (FLC) type.

The use of this liquid crystal of the ferroelectric smectic gel (or FLC, standing for "Ferroelectric Liquid Crystal") type makes it possible in particular to design rapid ocular obturators adapted to follow the rate of display of the projector in three dimensions.

Advantageously, the liquid crystal is of the polymer-stabilised ferroelectric smectic gel type (PSFLC).

The use of this liquid crystal of the polymer-stabilised ferroelectric smectic gel type (or PSFLC, standing for "Polymer Stabilised Ferroelectric Liquid Crystal") makes it possible, in addition to designing rapid ocular obturators, to produce robust viewing spectacles.

According to one advantageous feature of an embodiment of the invention, the first and second substrates are flexible.

According to another advantageous feature of an embodiment of the invention, the first and second substrates are non-flexible.

Advantageously, the first substrate is merged with the first polariser and/or the second substrate is merged with the second polariser.

Thus the substrates are no longer necessary for producing the cell of the viewing spectacles. The cost of manufacturing the viewing spectacles of an embodiment of the present invention is then reduced thereby.

In an advantageous embodiment of the invention, the viewing spectacles comprise a device for powering the cell comprising:

a module for detecting a synchronisation signal coming from the projector;

a module for supplying the detection module and the cell;

a control module comprising a switching and conversion module connected to the supply module and to said cell, said switching and conversion module being controlled by said detection module in order to supply said cell at a useful voltage V if the synchronisation signal is detected by the detection module.

The powering device thus makes it possible to supply the cell of the viewing spectacles only when the film has begun, that is to say when the detection module detects a synchronisation signal. The consumption is thus reduced thereby. This is because only the control module is supplied continuously but this consumes little. It is therefore not necessary to have a "start/stop" switch, unlike the prior art.

In another advantageous embodiment of the invention, the viewing spectacles are characterised in that:

the control module and the detection module are connected to a module for shaping said useful voltage V delivered by the control module, and said cell is connected to the control module by means of the shaping module, said shaping module is adapted to generate a square-wave addressing voltage at the frequency of the synchronisation signal.

Thus the addressing voltage is synchronised with the synchronisation signal so as to supply the cell according to the same rate of display of the digital content.

According to an advantageous feature, the control module also comprises a module for shaping a voltage U delivered by the supply module, the shaping module being connected to the switching and conversion module and to the detection module so as to generate a square-wave addressing voltage at the frequency of the desynchronisation signal.

Advantageously, the supply module is a self-contained battery.

Advantageously, the control module also comprises a module for automatically signalling a drop in charge of the self-contained battery.

According to an advantageous feature, when the detection module dose not detect any synchronisation signal and a drop in charge of the battery is detected by the automatic signalling module, said automatic signalling module:

delivers a square-wave useful voltage (V') at a perceptible low frequency at the input of the shaping module, and simultaneously delivers a control signal (S2') for controlling said shaping module, so that said shaping module restores said useful voltage (V') at said cell.

The automatic signalling of the drop in level of the supply battery charge then makes it possible to anticipate the failure of viewing spectacles and to withdraw them from the batch of spectacles available to the user.

BRIEF DESCRIPTION OF THE DRAWINGS

List of figures

Other subjects, features and advantages will emerge more clearly from a reading of the following descriptions, given by way of indicative and non-limitative example, and the accompanying drawings, among which.

DETAILED DESCRIPTION OF ILLUSTRATIVE EMBODIMENTS

Detailed Description

For the record, various techniques are used at the present time for producing spectacles for viewing 3D digital films.

The requirement for the quality of rendition of the movement in 3D vision has led for example to developing projection techniques based on a triple flash timed at 144 Hz instead of a technology based on a double flash timed at 96 Hz (an image alternately on each eye at a rate not perceptible to the eye) as opposed to a standard sampling cycle of the cinema at 48 Hz.

These types of solution require an ocular obturator technology that is rapid and of high comfort.

In the remainder of the description of one embodiment of the invention, a description is given of viewing spectacles for viewing three-dimensional digital content. According to an embodiment described hereinafter, the directors of the liquid crystal of the two zones are symmetrical and each form an angle β with respect to a first direction B1 defined as the bisector of the two polarisation axes of the first and second polarisers respectively, if said two polarisation axes of the first and second polarisers are perpendicular to each other.

Figure 1:
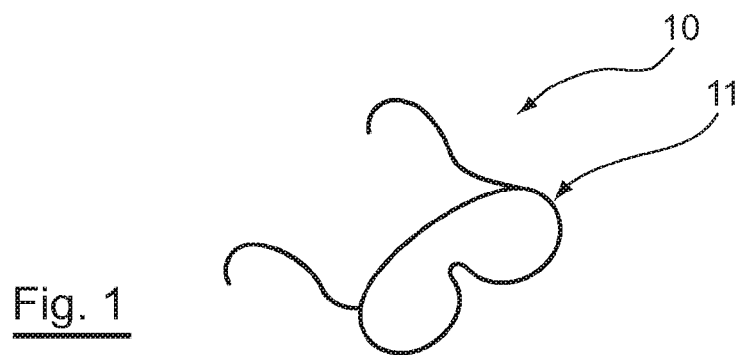
FIG. 1 is a schematic view of the viewing spectacles according to one embodiment of the invention.

FIG. 1 illustrates schematically the viewing spectacles 10 according to an embodiment of the invention, entirely novel and inventive, based on the use of a fast liquid crystal of the ferroelectric smectic gel (FLC) type.

To encompass the field of vision of each eye, the viewing spectacles 10 comprise a screen 11.

Figure 2:
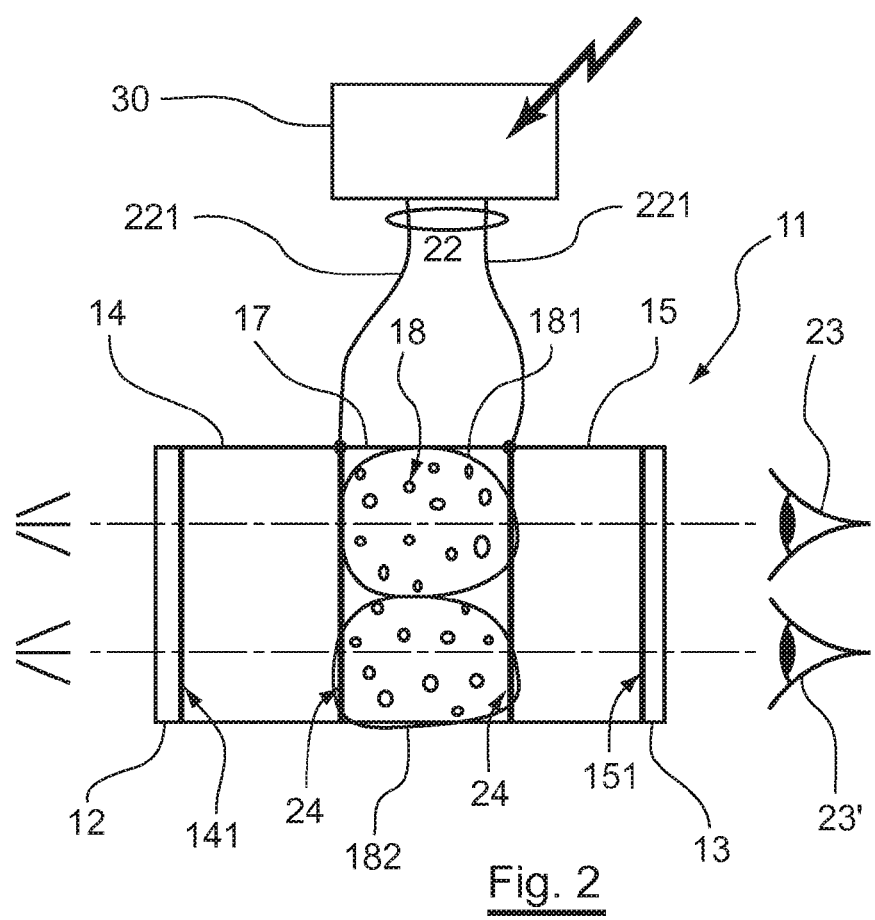
FIG. 2 is a schematic view of the various elements making up the viewing screen of the spectacles according to one embodiment of the invention.

As illustrated in FIG. 2, this screen 11 comprises several elements necessary for use thereof.

Thus the screen 11 is composed of a first and second substrate (14, 15) respectively disposed opposite each other.

Conventionally, when the first and second substrates (14, 15) are assembled, microballs (not shown) create a space between these two substrates once assembled. A cell 17 is thus produced. A liquid crystal 18 of the ferroelectric smectic type is then introduced therein through an orifice (not shown). For this type of liquid crystal, each director is a neutral axis of the liquid crystal.

According to an embodiment of the invention, this liquid crystal 18 is used in a half-wave blade configuration.

The first and second substrates (14, 15) each comprise respectively an internal face (141, 151) and an internal face (142, 152).

Each internal face (142, 152) also comprises a deposit of conductive electrodes 24.

To power the liquid crystal 18 contained in the cell 17, these electrodes 24 are connected by two electrical wire connections 221 to a device 30 for powering the cell 17.

The first and second substrates (14, 15) are therefore connected electrically to the powering device 30.

The powering device 30 is thus adapted to deliver an addressing voltage 22 to the two substrates (14, 15) of the cell 17. This addressing voltage 22, in the form of a half wave (as detailed below), makes it possible to switch the liquid crystal 18.

Cleverly, the powering device 30 delivers the addressing voltage 22 only when a synchronisation signal 20 coming from the projector is detected. The more detailed functioning of this powering device 30 and the associated advantages thereof will be described in the remainder of the description in relation to FIGS. 5 and 6.

To reduce the manufacturing costs, according to an embodiment of the present invention, the design of the viewing spectacles 10 comprises a minimum of elements.

First of all, the cell 17 of the screen 11 is the only one.

Next, in order to polarise the incoming and outgoing light, the first and second substrates (14, 15) of the cell 17 comprise respectively on their external face (141, 151) only a first and second rectilinear polariser (12, 13) with a polarisation axis P1 and P2 respectively as illustrated in FIGS. 4.1 to 4.3.

The polarisation axes P1 and P2 of these two polarisers (12, 13) are either parallel or perpendicular. In an embodiment described below, the two polarisation axes P1 and P2 are perpendicular.

According to another embodiment of the invention, the first substrate (14) is merged with first polariser (12) and/or the second substrate (15) is merged with the second polariser (13).

Such a configuration comprising a single cell 17 and only two polarisers (12, 13) then makes it necessary to create two distinct zones (181, 182) of the liquid crystal 18. These two zones (181, 182) are respectively situated in the vision axis of a right eye 23 and a left eye 23' of the user.

As will be seen in the remainder of the description in relation to FIGS. 4.1.$b$ to 4.3.$b$, the creation of these two distinct zones is essential for implementing an embodiment according to the invention.

In practice, an embodiment of the present invention proposes to use a liquid crystal 18 of the FLC gel type stabilised by a polymeric chain. Such a liquid crystal is better known by the term PSFLC gel. This choice guarantees very good impact strength of the liquid crystal 18 and an optical quality over the entire surface of the cell 17 thus favouring the production of a single cell 17. The use of such a liquid crystal is already known from a patent application document by the same author as the present invention (French patent application filing number 0702441, corresponding to U.S. application Ser. No. 12/594,796).

Equally, in comparison with a nematic liquid crystal requiring an alternating voltage with a continuous supply, the use of such a PSFLC liquid crystal reduces consumption, in standby mode or in operation.

Figure 3:
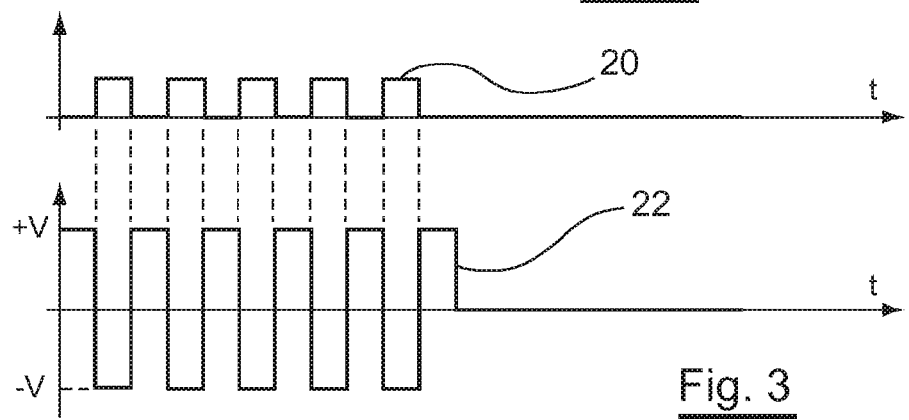
FIG. 3 illustrates the diagram of the synchronisation signal and the associated cell powering voltage diagram, FIGS. 4.1.$a$, 4.2.$a$ and 4.3.$a$ illustrate, for the three possible states of powering of the cell in FIG. 2 (0 volts, +V volts, -V volts), the obturation regime of the two zones of the screen of the viewing spectacles corresponding to the right eye and the left eye of the user, FIGS. 4.1.$b$, 4.2.$b$ and 4.3.$b$ illustrate, for the three possible states of powering of the cell in FIG. 2 (0 volts, +V volts, -V volts), the position of the polarisation axes of the two polarisers and the position of the directors of the liquid crystal for each zone of the cell.

FIG. 3 presents a diagram of the synchronisation signal 20 coming from the screen of the projector and a diagram of the addressing voltage 22 of the liquid crystal 18 contained in the cell 17.

The synchronisation signal 20 is typically a square-wave signal timed at a frequency compatible with the well known 3D projection techniques, for example of the double flash type (timed at 96 Hz).

The powering up of the cell 17 is activated by each of the rising and falling edges of the synchronisation signal 20. For example, the liquid crystal 18 is supplied at a voltage of −V volts at each rising edge of the synchronisation signal and at a voltage of +V volts at each falling edge of the synchronisation signal 20.

Without the detection of a synchronisation signal 20, the liquid crystal 18 is not supplied (0 volts).

FIGS. 4.1.*a* to 4.3.*a* illustrate, for the three possible states of powering of the cell of FIG. 2 (0 volts, +V volts, −V volts), the obturation regime (blocking or passing) of the zones (181, 182) of the screen 11 corresponding respectively to the right eye 23 and the left eye 23'. A description of each state of obturation of each eye for the three possible states of powering of the cell (0 volts, +V volts, −V volts) is detailed below.

In the remainder of the description, a distinct director of the liquid crystal (D181, D182) corresponds respectively to each zone (181, 182).

FIGS. 4.1.*b* to 4.3.*b* illustrate the position of the directors (D181, D182) of the liquid crystal 18 according to the addressing voltage 22 applied to the liquid crystal 18 according to an embodiment of the invention in which:
 the two polarisation axes (P1, P2) of the first and second polarisers (12, 13) are perpendicular to each other, and the tilt angle α of the liquid crystal 18 is 22.5°, and
 the directors (D181, D182) of the liquid crystal 18 of the two liquid crystal zones (181, 182) are symmetrical and each form an angle β of 22.5° with respect to a first direction B1 defined as the bisector of the two polarisation axes (P1, P2) of the first and second polarisers (12, 13) respectively.

In order to achieve alternately the obturation of the two zones (181, 182) of the liquid crystal 18 situated opposite the right eye 23 and the left eye 23' respectively (FIG. 2), it is necessary to have the best possible contrast between the right eye 23 and the left eye 23'. The two polarisation axes P1 and P2 of the two polarisers (12, 13) respectively being perpendicular, it is then necessary to use the liquid crystal 18 in a so-called half-wave blade configuration. Such a configuration makes it possible in particular to cover the two maximum contrast states corresponding to a polarisation of the incident light that is parallel (passing state) or perpendicular (blocked state) to the polarisation axis P2 of the exit polariser 13.

For the record, a configuration of a half-wave blade liquid crystal makes it possible to turn an incident rectilinear polarisation state of any angle δ if one of the inherent (or neutral) axes of the blade is oriented at δ/2 from the azimuth of the incident state. Thus, when δ takes the value 45°, the emergent polarisation state is perpendicular to the incident polarisation state.

Equally, in a known manner, the director of a liquid crystal is also a neutral axis of the liquid crystal.

According to an embodiment of the invention, the bisector B1 of the two polarisation axes (P1, P2) thus corresponds ideally to a neutral axis of the liquid crystal 18 configured as a half-wave blade according to the voltage applied to the liquid crystal (+V or −V volts).

Equally, in an optimum manner for optimising the contrast, the director D181 of the liquid crystal 18 contained in the first zone 181 and the director D182 of the liquid crystal 18 contained in the second zone 182 form an angle with each other of 45°.

For example, in order to perform this operation, a so-called combing method consist of orienting at 45° the two combing directions that will orient the two directors (D181, D182) of each zone (181, 182) of the liquid crystal 18. For example, in a known manner, this combing operation can be performed by a deposition of alignment photopolymer performed over the entire surface of the cell 17. The photo-alignment then takes place with polarisers turned through 45° with respect to each other for each zone (181, 182).

To perform this combing operation, it is necessary for the normal to the smectic layers of each zone (181, 182) of the liquid crystal 18 to be parallel to the direction of the alignment film of the two directors (D181, D182).

The two directions of the alignment film must also be symmetrical by an angle β with respect to the bisector B1 of the two polarisation axes (P1, P2).

To have the maximum contrast between the right eye 23 and left eye 23', the intrinsic tilt angle α of the liquid crystal 18 (corresponding to the angle formed by the orientation of the director of the liquid crystal with the combing direction) must make an angle of 22.5° with respect to the normal to the smectic layers. In this way, for each voltage (+V, −V) applied to the liquid crystal 18, a director, for example D181, is parallel to a polarisation axis P1 or P1 while the other director D182 is placed parallel to the bisector B1.

After having passed through the entry polariser 12 of polarisation axis P1, the polarisation of the instant light is parallel to the polarisation axis P1 of the entry polariser.

Through action of the half-wave blade, the rotation of the polarisation of the light of each zone (181, 182) next takes place solely if the polarisation of the incident light is not parallel to a director (D181, D182).

In practice, the intrinsic tilt angle α can be between 15° and 30° but in this case the contrast between the right eye 23 and the left eye 23' is not optimum.

Thus the contrast is optimum:
 if the bisector B1 of the two polarisation axes (P1, P2) is parallel to a director (D181 or D182) of the liquid crystal 18 according to the voltage applied (+V or −V volts),
 if the two directors (D181, D182) are symmetrical by an angle β of 22.5° with respect to the bisector B1, and
 if the intrinsic tilt angle α of the liquid crystal 18 forms an angle of 22.5° with respect to the associated director.

FIG. 4.1.*b* corresponds to the liquid crystal 18 not supplied by the powering device 30. The film has not yet begun. No synchronisation signal 20 is therefore detected coming from the projector. The device 30 powering the liquid crystal 18 is therefore not triggered. In this case, no electrical field is applied to the liquid crystal 18. The two directors (D181, D182) of the two zones (181, 182) therefore undergo nor rotation. The two directors (D181, D182) are then neither parallel nor perpendicular to the polarisation axis P2 of the exit polariser 13 (or analyser). In addition, the two directors (D181, D182) are symmetrical by an angle β of 22.5° with respect to the bisector B1 and the incident light (or ambient light) is polarised in the direction of the polarisation axis P1 of the entry polariser 12. The cell 17 of the liquid crystal 18 being configured as a half-wave blade and each director (D181, D182) of each zone (181, 182) not being parallel with the incident polarisation axis P1, the incident polarisation of the light is then neither parallel no perpendicular to the polarisation axis P2 of the exit polariser 13. More precisely, the polarisation of the incident light is then at 45° from the polarisation axis P2 of the exit polariser 13 for each zone (181, 182). The light then partially passes through the cell 17 for each zone (181, 182) of the liquid crystal 18. The viewing spectacles 10 are then partially transparent (or at least not "one-eyed") for the user although the film has not begun. Which is not the case in the document U.S. Pat. No. 6,943,852, where the vision perceived by the user is a one-eyed vision as long as the film has not begun.

FIG. 4.1.a illustrates this configuration of the screen 11 of the viewing spectacles 10. No zone (181, 182) corresponding respectively to the vision perceived by the right eye 23 and the left eye 23' is closed off. The vision perceived by the user is not one-eyed although the film has not yet begun.

FIGS. 4.2.b and 4.3.b correspond respectively to a liquid crystal 18 supplied at a negative (−V volts) and positive (+V volts) addressing voltage 22 delivered by the powering device 30. An electrical field is then generated perpendicular to the faces of the substrates (14, 15).

The director D181 or D182, or neutral axis, of each zone (181, 182) of the liquid crystal 18 then tends to align in the direction of application of the electrical field created by the addressing voltage 22 applied to the terminals of the two substrates (14, 15). Depending on the positive or negative value of the addressing voltage 22, the liquid crystal 18 then switches between two addressing positions defined by a cone of tilt angle α on an axis defined by the director D181 or D182.

For example, a voltage of −V volts is applied to the liquid crystal 18 for each rising edge of the synchronisation signal 20 and a voltage of +V volts is applied for each falling edge of the synchronisation signal 20 (FIG. 3).

At an addressing voltage 22 taking the value −V volts (FIG. 4.2.b), the tilt angle α of the liquid crystal being 22.5°, the directors (D181, D182) turn by 22.5° in the clockwise direction, and also:
 the director D181 of the zone 181 corresponding to the vision axis of the right eye forms an angle of 45° with the polarisation axis P2 of the polariser 13 and is parallel to the bisector B1, and
 the director D182 of the zone 182 corresponding to the vision axis of the left eye is perpendicular to the polarisation axis P2 of the polariser 13.

For the zone 181 corresponding to the right eye, the incident polarisation of polarisation axis P1 is then at 45° from the neutral axis defined by the director D181. The liquid crystal 18 being configured as a half-wave blade, the incident polarisation of the light is parallel to the polarisation axis P2 of the exit polariser 13. The zone 181 is in this case not closed off.

For the zone 182 corresponding to the left eye, the incident polarisation of polarisation axis P1 is parallel to the neutral axis defined by the director D182. The liquid crystal 18 being configured as a half-wave blade, the incident polarisation of the light undergoes no rotation and is then perpendicular to the polarisation axis P2 of the exit polariser 13. The zone 182 is in this case closed off.

FIG. 4.2.a illustrates this configuration of the screen 11 of the viewing spectacles 10. The zone 181 corresponding the vision perceived by the right eye 23 is not closed off and the zone 182 corresponding to the vision perceived by the left eye 23' is closed off.

At an addressing voltage 22 taking the value +V volts (FIG. 4.3.b), the tilt angle α of the liquid crystal being 22.5°, the directors (D181, D182) turn through 22.5° in the anticlockwise direction, and also:
 the director D181 of the zone 181 corresponding to the vision axis of the right eye is parallel to the polarisation axis P2 of the polariser 13, and
 the director D182 of the zone 182 corresponding to the vision axis of the left eye is at 45° to the polarisation axis P2 of the polariser 13 and parallel to the bisector B1.

For the zone 181 corresponding to the right eye, the incident polarisation of polarisation axis P1 is then at 90° from the neutral axis defined by the director D181. The liquid crystal 18 being configured as a half-wave blade, the incident polarisation of the light undergoes a rotation of 180° in order then to be situated perpendicular to the polarisation axis P2 of the exit polariser 13. The zone 181 is in this case closed off.

For the zone 182 corresponding to the left eye, the incident polarisation of polarisation axis P1 is situated at 45° from the neutral axis defined by the director D182. The liquid crystal 18 being configured as a half-wave blade, the incident polarisation of the light undergoes a rotation of 90° and is then parallel to the polarisation axis P2 of the exit polariser 13. The zone at 182 is not in this case closed off.

FIG. 4.3.a illustrates this configuration of the screen 11 of the viewing spectacles 10. The zone 181 corresponding to the vision perceived by the right eye 23 is closed off and the zone 182 corresponding to the vision perceived by the left eye 23' is not closed off.

Thus an embodiment of the present invention proposes to act on the particular orientation of the directors (D181, D182) of each zone (181, 182) of the liquid crystal by virtue of the use of a ferroelectric liquid crystal in symmetrical configuration. This makes it possible to reduce the number of polarisers necessary for producing the viewing spectacles 10 in comparison with the document U.S. Pat. No. 6,943,852. The manufacturing cost is then reduced (especially when the substrate is the polariser itself).

In addition, the use of a PSFLC polymerised liquid crystal gel 18 offers good impact strength. The use of such a liquid crystal 18 thus makes it possible to produce viewing spectacles 10 suitable for being manipulated frequently.

Figure 5:
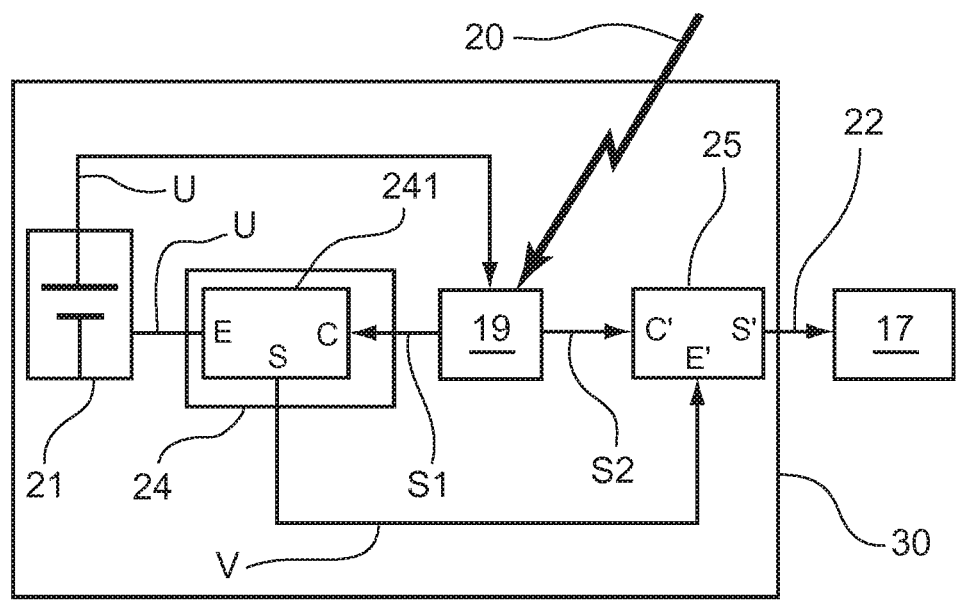
FIG. 5 illustrates schematically a first embodiment of the device for powering the cell appearing in FIG. 2.

FIG. 5 shows the detailed architecture of the device 30 for powering the liquid crystal 18 of the cell 17. This powering device 30 comprises a module 19 for detecting the synchronisation signal 20 transmitted by the projector. For example, this synchronisation signal 20 is an infrared signal.

In response to the detection of the synchronisation signal 20, the detection module 19 delivers a switching signal S1. This switching signal S1 is then supplied to a control module 24.

This control module 24 also comprises a switching and conversion module 241 provided with an input E, an output S and a control input C. This switching and conversion module 21 is in particular adapted to process the switching signal S1 applied at its control input C.

The powering device 30 also comprises a supply module 21 adapted to deliver a DC supply voltage U in volts. For example, this supply module 21 is a battery with a long storage life.

This voltage U makes it possible in particular to supply the detection module 19.

The switching and conversion module 241 of the control module 24 is also connected to the supply module 21 by its input E. The supply voltage U is then applied to the input E of the switching and conversion module 241.

As soon as the control input C of the switching and conversion module 241 receives the switching signal S1, that is to say when the detection module 19 has detected a synchronisation signal 20, the input E switches to the output S of the switching and conversion module 241.

The switching conversion module 241 then performs a conversion of the supply voltage U into a higher useful voltage V. This useful voltage is then applied to a module 25 for shaping the useful voltage V provided with an input E', and output S' and a control input C'. The useful voltage V is connected to the input E'.

This shaping module 25 is also connected to the detection module 19. The detection module 19 then delivers a signal S2 identically reproducing the synchronisation signal 20. This signal S2 is then delivered at the control input C' of the shaping module 25.

As soon as the detection module 19 detects a synchronisation signal 20, the shaping module 25 receives the signal S2 at its control input C'. The shaping module 25 then delivers at the output S' a square-wave addressing voltage 22. This addressing voltage 22 take the values (+V, −V, 0) volts according to the same time characteristics at the synchronisation signal 20, as described in FIG. 3.

The switching of the liquid crystal 18 is then effected by virtue of this addressing voltage 22.

Thus, according to an embodiment of the invention, the powering device 30 is supplied solely if a synchronisation signal 20 is detected by the detection module 19. Without detection of this signal, the detection module 19 is inactive and the addressing voltage 22 delivered by the powering device 30 is zero. The liquid crystal 18 contained in the cell 17 is then not supplied so as to be switched.

Unlike the spectacles of the document U.S. Pat. No. 6,943,852 requiring an on switch, it is therefore not necessary to employ an on switch to switch to standby for receiving a synchronisation signal. The consumption of the supply module 21 during the awaiting of the start of the projection is thereby reduced.

Obviously the viewing spectacles 10 of an present invention are adapted to all well known methods of distributing ocular images: double flash timed at 96 Hz, triple flash timed at 144 Hz.

Figure 6:
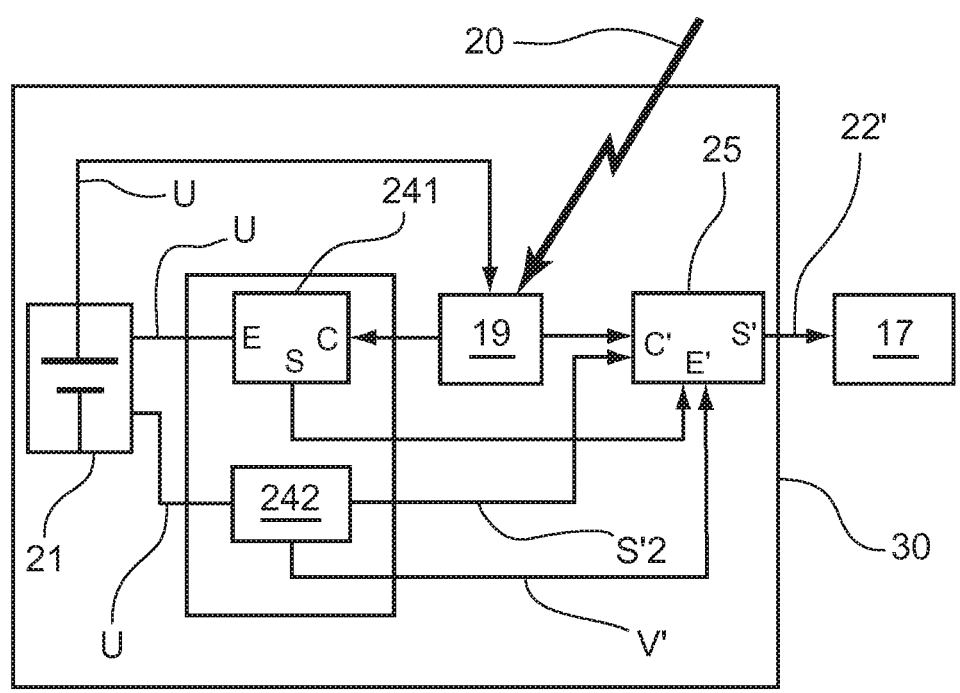
FIG. 6 illustrates schematically a second embodiment of the device for powering the cell appearing in FIG. 2.

According to another particular embodiment of the invention illustrated in FIG. 6, the supply module 21 is a self-contained battery. The control module 24 then comprises a supplementary module 242 for automatic signalling of the drop in the voltage level U delivered by the battery.

This automatic signalling module 242 is active only when the film has not yet begun, that is to say when the detection module 19 detects no synchronisation signal 20. The switching and conversion module 241 is in this case inactive since no control signal S1 is received at its control input C. The automatic signalling module 242 is then substituted for the switching and conversion module 241 in order to control the shaping module 25.

Thus, as soon as the voltage level U of the batteries passes below a predetermined threshold U1, the automatic signalling module 242 then generates a control signal S2' and a useful voltage V' in the form of a perceptible low-frequency square-wave. The useful voltage V' and the signal S2' are respectively supplied at the input E' and the command C' of the shaping module 25. The command signal S2' serves in particular to control the shaping module 25, so that the said shaping module 25 restores said useful voltage V' to said cell 17 at the output S'. The viewing spectacles 10 then produce a perceptible low-frequency beat indicating the end of life of the self-contained battery.

Thus an embodiment of the present invention proposes three-dimensional viewing spectacles 10 based on a fast liquid crystal of the ferroelectric smectic gel type (PSFLC) adapted to the rapid switching time.

Advantageously, the viewing spectacles 10 of an embodiment of the present invention are transparent for the user provided that the projection has not yet begun (or standby mode), that is to say when the liquid crystal 18 of the cell 17 does not switch.

In particular the use of the liquid crystal of the PSFLC gel type makes it possible to design robust viewing spectacles 10 adapted to a large number of manipulations.

Interestingly, the viewing spectacles 10 are active only when the synchronisation signal 20 transmitted by the projector is detected, that is to say when the film has already begun. Outside this regime, the consumption is almost zero. The service life of the viewing spectacles 10 is therefore increased in the case of the use of a self-contained supply battery.

An embodiment of the present invention also allows automatic signalling of the drop in level of the charge of the self-contained supply battery by means of a low-frequency blinking of the viewing spectacles 10. It is then possible to anticipate the failure of viewing spectacles and to withdraw them from the batch of spectacles available to the user.

Advantageously, the simplicity of design of the viewing spectacles 10 limits the manufacturing cost. In particular, it is not necessary to have a start/stop switch and the necessary number of polarisers is reduced.

An exemplary embodiment proposes three-dimensional viewing spectacles, based on liquid crystal, that are easy to manufacture at a lower manufacturing cost.

An embodiment provides robust viewing spectacles adapted to be manipulated a large number of times.

An embodiment provides viewing spectacles that consume little energy.

An embodiment provides viewing spectacles that are transparent for the user as soon as the viewing spectacles are placed on the field of vision of the user while awaiting the start of the projection of the film ("standby" mode).

An embodiment provides viewing spectacles adapted to follow the rates of display of three-dimensional digital content.

Although the present disclosure has been described with reference to one or more examples, workers skilled in the art will recognize that changes may be made in form and detail without departing from the scope of the disclosure and/or the appended claims.

The invention claimed is:

1. Spectacles for three-dimensional viewing of digital video content from a projector, said spectacles comprising:
   a single cell comprising first and second substrates disposed facing each other in order to form a free space;
   a liquid crystal placed in said free space and having a half-wave blade configuration;

a first rectilinear polariser of polarisation axis P1 adapted to polarise light coming from said projector and disposed on a first external surface of the first substrate of the cell; and a second rectilinear polariser of polarisation axis P2 is disposed on a second external surface of the second substrate, said polarisation axes P1 and P2 of the first and second polarisers being parallel or perpendicular to each other, wherein the liquid crystal comprises first and second distinct zones each situated opposite a vision axis, right and left respectively, the first zone comprising a first director and the second zone comprising a second director, said first and second directors:

being symmetrical and each forming an angle β with respect to a first direction B1 defined as the bisector of the two polarisation axes P1 and P2 of the first and second polarisers respectively, if said two polarisation axes P1 and P2 of the first and second polarisers are perpendicular to each other, or being symmetrical and each forming an angle β with respect to a second direction B2 forming an angle of 45° with respect to a common polarisation axis P of the first and second polarisers, if said two polarisation axes P1 and P2 of the first and second polarisers are parallel to each other, or being symmetrical and each forming an angle π/2−β with respect to a third direction B3 perpendicular to the bisector of the two polarisation axes P1 and P2 of the first and second polarisers respectively, if said two polarisation axes P1 and P2 of the first and second polarisers are perpendicular to each other, or being symmetrical and each forming an angle π/2−β with respect to a fourth direction B4 forming an angle of −45° with respect to a common polarisation axis P of the first and second polarisers if said two polarisation axes P1 and P2 of the first and second polarisers are parallel to each other.

2. The spectacles according to claim 1, wherein the liquid crystal has an intrinsic tilt angle α comprised between 15° and 30°.

3. The spectacles according to claim 1, wherein the liquid crystal has an intrinsic tilt angle α comprised between 21.5° and 23.5°.

4. The spectacles according to claim 1, wherein said angle β is comprised between 15° and 30°.

5. The spectacles according to claim 1, wherein said angle β is comprised between 21.5° and 23.5°.

6. The spectacles according to claim 1, wherein the liquid crystal is of the ferroelectric smectic gel (FLC) type.

7. The spectacles according to claim 1, wherein the liquid crystal is of the polymer stabilised ferroelectric smectic gel (PSFLC) type.

8. The spectacles according to claim 1, wherein the first and second substrates are flexible.

9. The spectacles according to claim 1, wherein the first and second substrates are non-flexible.

10. The spectacles according to any one of claim 1, wherein the first substrate is merged with the first polariser, the second substrate is merged with the second polariser, or both the first substrate is merged with the first polariser and the second substrate is merged with the second polariser.

11. The spectacles according to any one of claim 1, further comprising a device for powering the cell, comprising:
a module that detects a synchronisation signal coming from the projector;
a module that supplies the detection module and the cell;
a control module comprising a switching and conversion module connected to the supply module and to said cell, said switching and conversion module being controlled by said detection module in order to supply said cell with a useful voltage V if the synchronisation signal is detected by the detection module.

12. The spectacles according to claim 11, wherein:
the control module and the detection module are connected to a module that shapes said useful voltage V delivered by the control module, and
said cell is connected to the control module by the shaping module,
said shaping module is adapted to generate a square-wave addressing voltage at the frequency of the synchronisation signal.

13. The spectacles according to claim 11, wherein the control module also comprises a module that shapes a voltage U delivered by the supply module, the shaping module being connected to the switching and conversion module and to the detection module so as to generate a square-wave addressing voltage at the frequency of the synchronisation signal.

14. The spectacles according to claim 11, wherein the supply module is a self-contained battery.

15. The spectacles according to claim 14, wherein the control module also comprises a module that automatically signals a drop in the battery charge.

16. The spectacles according to claim 15, wherein, when the detection module is not detecting a synchronisation signal and when a drop in the battery charge is detected by the automatic signalling module, said automatic signalling module:
delivers a square-wave useful voltage (V') at a perceptible low frequency at the input of the shaping module, and
simultaneously delivers a control signal (S2') for controlling said shaping module, so that said shaping module restores said useful voltage (V') at said cell.

* * * * *

UNITED STATES PATENT AND TRADEMARK OFFICE
CERTIFICATE OF CORRECTION

PATENT NO.       : 8,508,586 B2                                                                Page 1 of 1
APPLICATION NO. : 12/812343
DATED            : August 13, 2013
INVENTOR(S)      : De La Tocnaye et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 615 days.

Signed and Sealed this

Fifteenth Day of September, 2015

Michelle K. Lee
*Director of the United States Patent and Trademark Office*

UNITED STATES PATENT AND TRADEMARK OFFICE
CERTIFICATE OF CORRECTION

PATENT NO. : 8,508,586 B2
APPLICATION NO. : 12/812343
DATED : August 13, 2013
INVENTOR(S) : De La Tocnaye et al.

Page 1 of 1

It is certified that error appears in the above-identified patent and that said Letters Patent is hereby corrected as shown below:

In the Claims

In Column 13, Claim 1:

in line 36, delete "polarisers if" and insert --polarisers, if--.

In Column 14, Claims 10-12:

in line 5, delete "any one of";

in line 10, delete "any one of";

in lines 17-18, delete "cell , said" and insert --cell, said--.

Signed and Sealed this
Nineteenth Day of January, 2016

Michelle K. Lee
*Director of the United States Patent and Trademark Office*